Aug. 11, 1970     H. J. FITZGERALD     3,523,611

OIL SKIMMING APPARATUS

Filed April 1, 1969     2 Sheets-Sheet 1

INVENTOR.
HUGH J. FITZGERALD
BY Curtis, Morris & Safford
ATTORNEYS

Aug. 11, 1970   H. J. FITZGERALD   3,523,611
OIL SKIMMING APPARATUS
Filed April 1, 1969   2 Sheets-Sheet 2
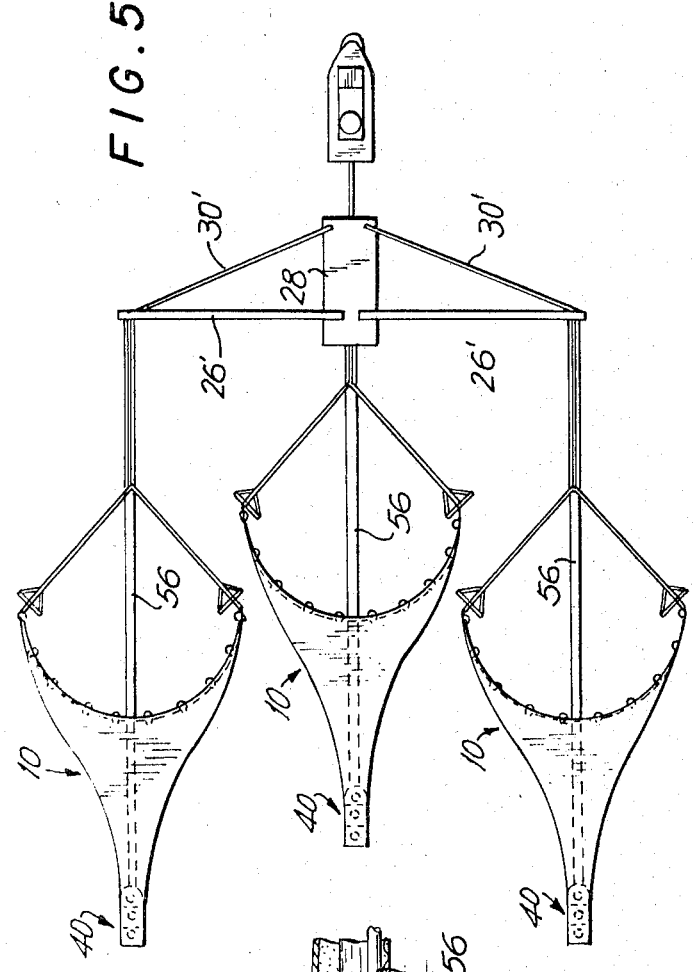
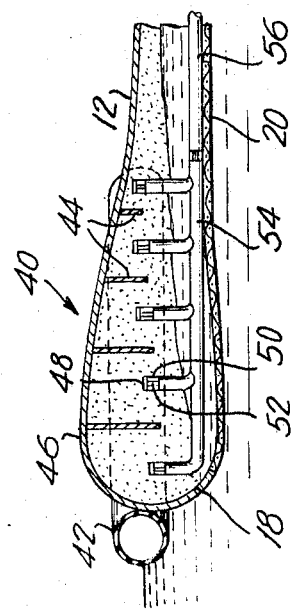
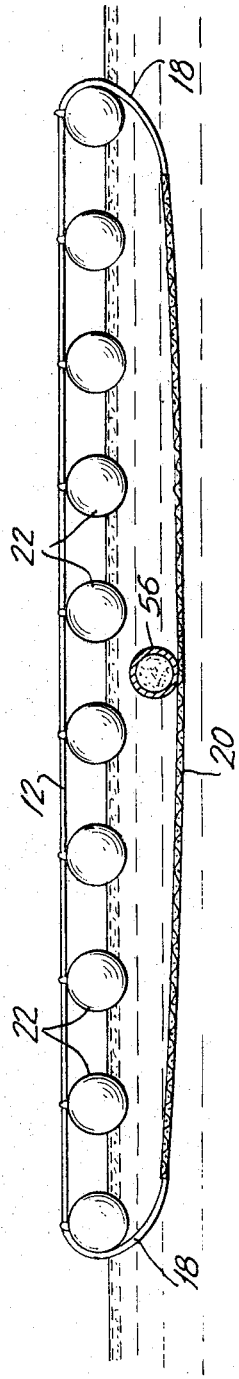
INVENTOR.
HUGH J. FITZGERALD

United States Patent Office 3,523,611
Patented Aug. 11, 1970

3,523,611
OIL SKIMMING APPARATUS
Hugh J. Fitzgerald, Austin, Tex., assignor to Ocean Pollution Control, Inc., Dallas Tex., a corporation of Texas
Filed Apr. 1, 1969, Ser. No. 811,713
Int. Cl. B01d 23/00
U.S. Cl. 210—242
10 Claims

ABSTRACT OF THE DISCLOSURE

Apparatus for skimming an oil film from the surface of a large body of water including a towed funnel assembly with a flexible cover and side skirts of impermeable sheet material with floats to keep the leading edge of the cover spaced above the surface of the water so that the oil film will pass beneath it, with the remaining portions of the cover supported on the floating oil, a bottom panel of netting to hold the side skirts in downwardly projecting position to confine the oil laterally, while permitting the water beneath it to escape freely, and a sump at the apex of the funnel to receive the oil for transfer to storage vessel.

---

This invention relates to an apparatus for removing an oil film from the surface of a large body of water.

It is well known that when oil is released in or on a large body of water, because of the immiscibility of oil with water and the fact that oil is lighter than water, the oil rises to the surface of the water in the form of a film or slick which spreads to cover a large area and which is capable of migrating considerable distances depending upon the wind and the current. Where large quantities of oil are released, for example due to the sinking or damage of an oil tanker or to escape of oil under pressure through a fissure in an otherwise impermeable formation overlying an oil reservoir or adjacent to the borehole of an off-shore drilling operation, movement of the oil slick to adjacent coastal areas can not only form an unsightly and messy residue on beaches, interfering with their recreational uses, but also have serious effects on aquatic birds, fish and other marine life, as well as other adverse ecological consequences.

Heretofore there has been no effective means for removing large oil films from open bodies of water. Attempts to use detergents and other chemicals to emulsify and/or disperse the oil have for the most part proven ineffective. On the other hand, attempts to skim the oil from the surface by mechanical means, such as a chain of logs connected end to end with the two ends of the chain towed by a pair of tugboats moving on parallel courses, have proved virtually worthless due to the fact that the surface of an ocean, bay or large inland lake is almost invariably subject to waves or choppiness which causes the oil film to be washed over the tops of the logs so that most of the oil escapes. There was also difficulty in maneuvering the tugboats to keep the log chain extended and moving perpendicularly to sweep the surface without allowing the oil to spill from the end of the chain.

The present invention provides a novel apparatus consisting, in general terms, of a tapered funnel assembly having a cover of flexible sheet material substantially impermeable to oil which can be towed by a single boat in a direction perpendicular to the wide end of the funnel with float means to keep the leading edge of the funnel spaced above the surface of the water so that the oil film will pass beneath it. The remaining portions of the cover ride upon the floating film of oil, the flexibility of the cover allowing it to conform readily to the wave motion and chop of the water surface. The funnel is provided at each side with skirt portions of similar flexible, impermeable sheet material, the lower edges of these skirts being attached to opposite edges of a bottom panel of netting which holds the skirts in proper downwardly projecting position to confine the oil laterally while permitting the water beneath it to pass freely through the bottom panel. The tapered shape of the funnel channels the oil rearwardly and inwardly to a sump at the apex of the funnel. This sump is likewise provided at the bottom with a panel of netting to permit the water beneath the oil to move freely out of the sump. The sump is preferably divided by transversely extending vertical partitions into separate chambers to limit movement of water upwardly into the sump due to wave action and turbulence. Flexible oil lines having their input ends respectively positioned in the several chambers of the sump extend forwardly to a storage barge which is located between the funnel assembly and the towboat.

This apparatus, because of the extreme flexibility of the funnel assembly and its consequent ability to conform to the surface of the water, provides a very efficient means of sweeping the oil film from the surface of the water, allowing little if any of the oil to escape. The apparatus is inexpensive in construction, light in weight and easy to handle and may be towed by a single towboat with good maneuverability and short turning radius. Thus, a large body of water may be effectively cleared of surface oil in a short time at low cost.

In the drawings:

FIG. 3 is a transverse sectional view taken generally along the line 3—3 of FIG. 1.

FIG. 4 is a fragmentary vertical sectional view taken generally along the line 4—4 of FIG. 1.

FIG. 5 is a diagrammatic plan view showing an alternative embodiment of the invention in which three funnel assemblies are towed by a single towboat.

Figure 1:
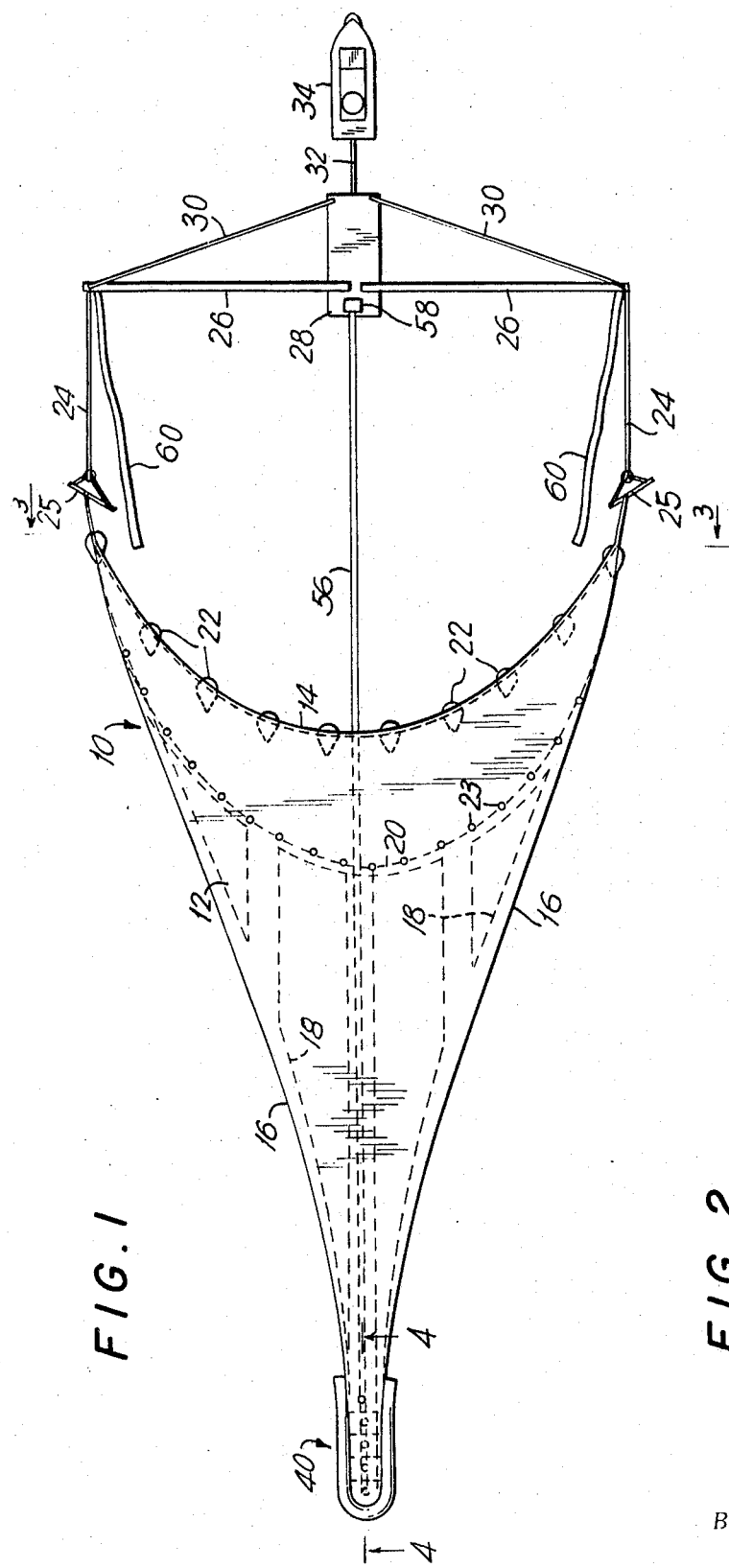
FIG. 1 is a diagrammatic plan view of an illustrative apparatus embodying features of the present invention being towed by a towboat.
Figure 2:
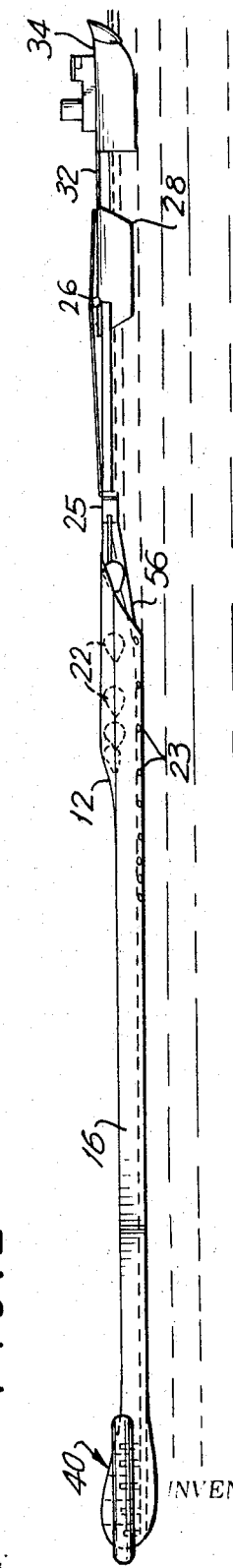
FIG. 2 is a side elevational view, partly in section, of the apparatus of FIG. 1.

The illustrative apparatus shown in FIGS. 1–4 includes a funnel assembly generally designated 10 which is formed of a cover 12 of flexible sheet material such as closely woven canvas, nylon or Dacron which is impervious and impermeable to oil, having a tapered shape with a concave leading edge 14 of catenary shape and tapered trailing edges 16 from which depend skirt members 18, as best shown in FIG. 3, with the lower edges of the skirt members 18 connected to the opposite edges of a bottom panel 20 of open material, such as gill netting, which extends across and encloses the bottom of the funnel assembly. The leading edge 14 of the cover is reinforced by a heavy rope which is attached to and rests upon a series of floats 22 of such size as to keep the leading edge 14 spaced generally above the surface of the water an average distance of approximately one foot to insure that, as the funnel assembly is towed in a direction perpendicular to the leading edge 14, the oil film will pass beneath the leading edge 14 and along the bottom of the cover 12, with the trailing portions of the cover 12 being supported by the floating film of oil. The leading edge of the bottom netting panel is likewise reinforced by a heavy rope carrying spaced weights 23 to keep it submerged. As the funnel assembly is towed, the substantial pressure of the oil and water against the tapered sides 16 of the funnel and the lesser drag of the bottom netting panel 20 will maintain the somewhat flattened conical shape of the funnel, while its flexibility will permit it to conform readily and accurately to the changing surface of the water. The bottom netting panel 20 limits outward movement of the skirt portions 18 and insures their downward extension for a sufficient depth, for example two to six feet, to entrap all of the oil which enters through the wide leading end of the funnel and prevent the escape of such oil with the water which is permitted to move freely through the bottom netting 20 and out of the funnel.

The two ends of the leading edge 14 of the funnel are connected to tow lines 24 which are provided with otter boards 25 which are provided with harnesses to keep them angled forwardly at their outer ends to convert the forward motion of the tow into outwardly directed lateral forces at the opposite ends of the leading edge 14 and thus keep the leading edge extended to maintain the shape of the funnel. The forward ends of the tow lines 24 are connected to the outer ends of outrigger booms 26 whose inner ends are pivoted on a storage barge 28 and which are braced by back stays 30 which extend between the forward end of the storage barge 28 and the outer ends of the outrigger booms 26. The forward end of the storage barge 28 is connected by a tow line 32 to a towboat 34.

At the apex of the funnel assembly is an oil sump generally designated 40 which, as best shown in FIG. 4, is a narrow, elongated enclosure effectively constituting an upwardly enlarged rearward extension of the cover 12, side skirts 18 and bottom netting 20 of the funnel. In the particular embodiment shown in FIG. 4, the sump is supported within an inflated U-shaped float 42 similar in construction to a rubber life raft, with the sides of the float 42 supporting transversely extending vertical partitions 44 of a relatively stiff and impermeable sheet material which extend between the sides to divide the sump into a plurality of longitudinally spaced chambers. The upper edges of these partitions 44 adjoin the cover sheet 46 on top of the sump and extend downwardly into the sump to graduated depths increasing from the leading end to the trailing end of the sump. Thus, as the oil moves rearwardly into the sump, the lower edges of the successive partitions skim incremental "layers" off the top of the oil. An outlet pipe 48 extends vertically upwardly into each of the chambers, the upper ends of the pipes being held by clamps 50 which were supported on webs 52 extending transversely between the side walls of the float 42. The positions of the upper ends of the pipes 48 are graduated in height, decreasing from the leading end to the trailing end of the sump. These pipes 48 all communicate with a manifold 54, the forward end of which is connected to a flexible line 56 which extends forwardly to a pump 58 located on the storage barge 28 to move the oil from the sump 40 to the storage barge 28.

Trailing from the outer ends of the outrigger booms 26 are a pair of hollow flexible tubular pipes 60, closed at each end to keep out the water and maintain their buoyancy and insure that they will float along the surface of the water. These pipes are of a substantial diameter, for example six inches, and serve the purpose of guiding the film of oil inwardly toward the leading edge 14 of the funnel assembly 10 to prevent the oil from being spread beyond the ends of the funnel assembly by the wake of the towboat 34 and storage barge 28.

As will be appreciated from the foregoing description, as the apparatus is towed by a towboat 34, an area of the surface of the water having a width equal to the width of the input end of the funnel assembly 10 is swept of oil. This oil is funneled rearwardly and inwardly to the sump 40. The oil film on the water may normally range in thickness from several molecules to several inches, depending upon the distance from the oil source. As the oil film is laterally concentrated toward the narrow end of the funnel assembly 10, its thickness is of course increased, perhaps to as much as several feet. Due to the buoyancy of the oil, the upper portion of this oil mass may extend as much as a foot above the surface of the water and several feet below the surface. The flexibility of the cover members 12 and 46 is sufficient to accommodate this upward bulging of the oil mass, while the skirts 18 extend downwardly beneath the surface a sufficient depth to trap all of the oil and channel it rearwardly into the sump 40 where it is removed through the pipes 48 and 56 as fast as it accumulates. This provides a continuous and rapid oil removal operation which can continue uninterruptedly until the storage barge is filled or even longer by providing means for pumping the oil through a flexible pipe from the storage barge to another vessel moving on a parallel course alongside the storage barge while the sweeping operation continues, in the same fashion as the refueling of ships by a tanker while underway.

While the arrangement of the partitions 44 and the inlet ends of the pipes 48 in the sump 40 will result in a high oil/water ratio in the liquid removed to the storage barge under conditions of extreme choppiness resulting in turbulent mixing of oil and water within the sump, a higher percentage of water may be received at the storage barge. Under such conditions it is desirable to provide an oil/water separator on the storage barge. Thus the water can be separated from the oil and discharged back into the main body of water so that only the oil is retained in the storage barge.

Although the funnel covers a large area, its light weight and flexibility and low water resistance limits the strain which is imposed upon it, and renders the apparatus practical and durable. Preferably the apparatus is towed at a relatively slow speed, on the order of three knots, to limit the strain upon it, as well as to insure capture of substantially all the oil in the area swept. However, because of the considerable width of the funnel, it is possible to sweep a large area in a short time.

FIG. 5 shows an alternative embodiment of the invention in which three smaller funnel assemblies similar in construction to that shown in FIGS. 1–4 are towed by a single towboat using outrigger booms 26' and back stops 30' on the storage barge 28 with the three oil lines 56 extending respectively from the three sumps 40 forwardly, the center feed line 56 going directly to the storage barge 28 and the two outer feed lines 56 going forwardly to the outrigger booms 26' and along the bottom of the outrigger booms to the storage barge 28.

I claim:

1. Apparatus for removing an oil film from the surface of a large body of water comprising a funnel assembly including a cover of flexible sheet material impervious and impermeable to oil, having a tapered shape, towing means for towing said cover in a direction perpendicular to the wide end of such taper which serves as the leading edge, with the two tapered sides of such funnel forming the trailing edges, floats spaced along said leading edge to keep it generally spaced above the surface of the water as it is towed, skirt portions extending downwardly from the trailing edges of said cover for a short distance under the water to trap the oil at the surface and channel it rearwardly and inwardly toward the narrow output end of said funnel, a bottom member freely permeable to water underlying said cover and secured to the edges of said skirt portions to limit their outward movement and assure their extension downwardly into the water, and a sump at the apex of said funnel assembly to receive the oil, a storage vessel proximate said funnel assembly, one or more flexible fluid lines extending from said sump to said storage vessel, pump means for moving said oil through said lines to said storage vessel.

2. Apparatus as described in claim 1 in which said bottom member is made of netting.

3. Apparatus as described in claim 1 in which said sump comprises a narrow enclosure effectively constituting rearward extensions of said cover and said skirt means with the forward end of said enclosure communicating with the narrow output end of said funnel assembly, and with skirt means extending around the rearward end of the sump means to close the same, while leaving the bottom of said sump means open to allow the escape of the water beneath the oil.

4. Apparatus as described in claim 3 in which said sump includes vertical partitions connected to and extending transversely between said skirt portions to divide said enclosure into a plurality of longitudinally spaced chambers, and wherein a plurality of outlet tubes extend vertically upward, one in each of said chambers, to predetermined levels, with said outlet tubes being connected to said fluid lines for drawing oil from the upper portions of said chambers into said fluid lines.

5. Apparatus as described in claim 4 in which the lower edges of said partitions and the upper ends of said outlet tubes are positioned at graduated levels, decreasing in height from the leading end toward the trailing end of said sump.

6. Apparatus for removing an oil film from the surface of a large body of water comprising a funnel assembly including a cover of flexible sheet material impervious and impermeable to oil, having a tapered shape, a tow harness adapted to be connected to a towboat and extending therefrom across the width of said leading edge for towing said funnel assembly in a direction perpendicular to said leading edge, extender means for keeping said leading edge extended laterally, skirt portions extending downwardly from the trailing edges of said cover for a short distance under the water to trap the oil at the surface and channel it rearwardly and inwardly toward the narrow output end of said funnel, a bottom member freely permeable to water underlying said cover and secured to the edges of said skirt portions to limit their outward movement and assure their extension downwardly into the water, and a sump at the apex of said funnel assembly to receive the oil-water mixture, a storage vessel proximate said funnel assembly, one or more flexible fluid lines extending from said sump to said storage vessel for conveying the oil-water mixture to said storage vessel.

7. Apparatus as described in claim 2 in which said extender means comprises otter boards attached at the outer ends of said leading edge and oriented to convert the forward motion of said funnel assembly into outwardly directed lateral forces at the ends of said leading edge.

8. Apparatus as described in claim 6 in which said storage vessel is located between said tugboat and said funnel assembly and the forward end of said harness is connected to said storage vessel.

9. Apparatus as described in claim 8 in which outrigger poles extend laterally outwardly from opposite sides of said storage vessel and flexible float members trail from the outer ends of said outrigger poles along the surface of the water to resist spreading of the oil in the wake of said towboat and storage vessel and direct it toward the mouth of said funnel assembly.

10. Apparatus for removing an oil film from the surface of a large body of water comprising a funnel assembly including a cover of flexible sheet material impervious and impermeable to oil, having a tapered shape, a tow harness adapted to be connected to a towboat and extending therefrom across the width of said leading edge for towing said funnel assembly in a direction perpendicular to said leading edge, extender means for keeping said leading edge extending laterally, skirt portions extending downwardly from the trailing edges of said cover for a short distance under the water to trap the oil at the surface and channel it rearwardly and inwardly toward the narrow output end of said funnel, a bottom member freely permeable to water underlying said cover and secured to the edges of said skirt portions to limit their outward movement and assure their extension downwardly into the water, and a sump at the apex of said funnel assembly to receive the oil-water mixture, a storage vessel proximate said funnel assembly, one or more flexible fluid lines extending from said sump to said storage vessel for conveying the oil-water mixture to said storage vessel, separator means on said storage vessel for separating the oil from the water in said oil-water mixture, and discharge means for discharging the water separated by said separator means from said storage vessel back to the body of water while retaining the oil in said storage means.

References Cited
UNITED STATES PATENTS

| | | | |
|---|---|---|---|
| 3,348,690 | 10/1967 | Cornelissen | 210—523 X |
| 3,369,664 | 2/1968 | Dahan | 210—242 X |

REUBEN FRIEDMAN, Primary Examiner

T. A. GRANGER, Assistant Examiner